United States Patent
Higman et al.

(10) Patent No.: US 8,292,776 B1
(45) Date of Patent: Oct. 23, 2012

(54) DRIVE SYSTEM WITH LOW SPEED, HIGH TORQUE DRIVE MODE AND FREEWHEEL MODE

(75) Inventors: Jerad Higman, Vermillion, SD (US); Aaron Sudbeck, Hartington, NE (US); Harold Dojan, Luck, WI (US)

(73) Assignee: Masaba Mining Equipment, Inc., Vermillion, SD (US)

( * ) Notice: Subject to any disclaimer, the term of this patent is extended or adjusted under 35 U.S.C. 154(b) by 486 days.

(21) Appl. No.: 12/574,153

(22) Filed: Oct. 6, 2009

Related U.S. Application Data

(60) Provisional application No. 61/187,729, filed on Jun. 17, 2009.

(51) Int. Cl.
*F16H 3/44* (2006.01)
*F16H 48/30* (2006.01)
*B60K 17/04* (2006.01)

(52) U.S. Cl. .................. 475/298; 475/150; 180/372

(58) Field of Classification Search .............. 475/149, 475/150, 298, 338, 204, 205, 223; 180/371, 180/372, 247
See application file for complete search history.

(56) References Cited

U.S. PATENT DOCUMENTS

| | | | | | |
|---|---|---|---|---|---|
| 3,184,985 | A | * | 5/1965 | Dreitzler | ..................... 74/377 |
| 3,812,928 | A | * | 5/1974 | Rockwell et al. | .......... 180/65.51 |
| 4,476,953 | A | * | 10/1984 | Hiraiwa | ...................... 180/249 |
| 4,739,852 | A | * | 4/1988 | Stevens et al. | .............. 180/9.62 |
| 5,018,592 | A | * | 5/1991 | Buchdrucker | .............. 180/19.3 |
| 5,415,598 | A | * | 5/1995 | Sawase et al. | ................. 475/86 |
| 5,429,221 | A | * | 7/1995 | Tanzer | ..................... 192/85.57 |
| 6,358,176 | B1 | * | 3/2002 | Nauheimer et al. | ......... 475/149 |
| 6,659,249 | B2 | * | 12/2003 | Borgen et al. | ................... 192/50 |
| 2006/0205555 | A1 | * | 9/2006 | Bowen | ......................... 475/204 |

\* cited by examiner

*Primary Examiner* — Roger Pang
(74) *Attorney, Agent, or Firm* — Jeffrey A. Proehl; Woods, Fuller, Shultz & Smith, PC

(57) ABSTRACT

A drive system with drive and freewheel modes comprises a final transfer element for receiving and rotating with a drive axle, and a final drive assembly in rotational communication with a motor. The final drive assembly is selectively engageable with the final transfer element to drive an axle received by the final transfer element. The final drive assembly has an engaged condition in which power is transferred through the final drive assembly to the drive axle and a disengaged condition in which power is not transferred through the final drive assembly. The final drive assembly comprises a gear set selectively engagable with the final transfer element in the engaged condition such that rotation of the gear set is transferred to the final transfer element. The gear set is selectively disengageable from the final transfer element in the disengaged condition such that rotation of the final transfer element is not transferred to the gear set.

19 Claims, 9 Drawing Sheets

DRIVE SYSTEM WITH LOW SPEED, HIGH TORQUE DRIVE MODE AND FREEWHEEL MODE

REFERENCE TO RELATED APPLICATION

This application claims the benefit of U.S. Provisional Application for patent No. 61/187,729, filed on Jun. 17, 2009, which is hereby incorporated by reference in its entirety.

BACKGROUND

1. Field

The present disclosure relates to drive systems and more particularly pertains to a new drive system with a low speed, high torque drive mode and a freewheel mode.

2. Description of the Prior Art

Conveyors have been mounted on trailers to be towed behind motorized vehicles for transport over long distances. Recently, conveyors have been developed that are able to move short distances for the purpose of distributing the material carried on the conveyor belt over an area of ground, rather than simply in a pile at a single location. This movement does not require high speed movement over long distances, but requires a relatively slow and uniform pace of movement over short distances. While this movement does not require the entire conveyor to be moved, and it is common that one end of the conveyor is pinned in a single location while the other end is swung in an arc with respect to the stationary end, and quite often the conveyor apparatus, as well as the material being conveyed on the apparatus, is extremely heavy and requires a significant amount of force to move even these limited distances. Such heavy duty drive systems are typically not suitable for turning at the high speeds encountered when the conveyor is towed on a highway.

Various systems have been developed for these conveyors to permit the two modes of use, with one approach being disclosed in U.S. Pat. No. 5,515,961, which employs a set of wheels for higher speed road travel and a separate set of wheels for the slower movement during conveying operations. While this approach works, the extra set of wheels and the apparatus to deploy those extra wheels add significantly to the cost and weight and overall bulk of the conveyor apparatus, making this approach less than desirable.

Another approach utilizes wheels that are mounted on a support that may be swung between a position in which the wheels are oriented for towing of the conveyor and a position in which the wheels are oriented for causing lateral back and forth motion of one end of the conveyor. This approach generally adds less weight to the conveyor apparatus, the known systems have utilized chains for a system to drive the wheels for the back and forth motion. However, the chains need to be removed or disconnected when the conveyor is to be towed on the road. The chains needed to transfer the significant amount of power required to move the large conveyors are very heavy and cumbersome to install and remove, making the changeover process lengthy, strenuous and somewhat dangerous.

As can be appreciated from the foregoing, drive systems for mobile apparatus, such as conveyors that are mounted on trailers but intended to be capable of a degree of independent movement, present a challenge for designers. It is therefore believed that there is a need for an improved drive system for such apparatus that minimizes size, weight, and effort for converting between modes of operation.

SUMMARY

In view of the foregoing disadvantages inherent in the known types of drive systems now present in the prior art, the present disclosure describes a new drive system with a low speed, high torque drive mode and a freewheel mode.

The present disclosure relates to a drive system with a drive mode and freewheel mode. The system comprises a motor configured to generate rotational movement, a final transfer element configured to receive and rotate with a drive axle, and a final drive assembly in rotational communication with the motor. The final drive assembly is selectively engageable with the final transfer element to drive a drive axle when the drive axle is received by the final transfer element. The final drive assembly has an engaged condition in which power is transferred through the final drive assembly to the final transfer element and a disengaged condition in which power is not transferred through the final drive assembly to the final transfer element. The final drive assembly comprises a gear set positioned adjacent to the final transfer element. The gear set is selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
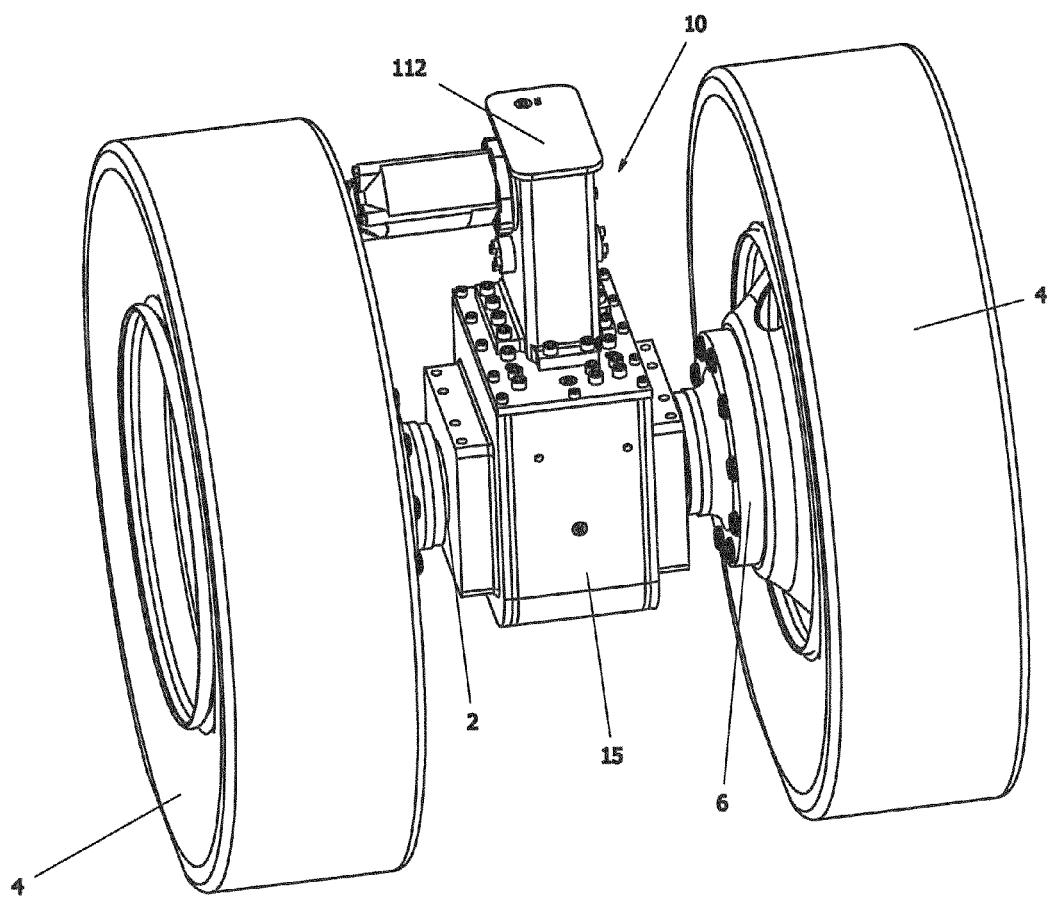
FIG. 1 is a schematic perspective view of the new drive system of the present disclosure in an illustrative application driving a pair of wheels positioned on each side of the system.
Figure 2:
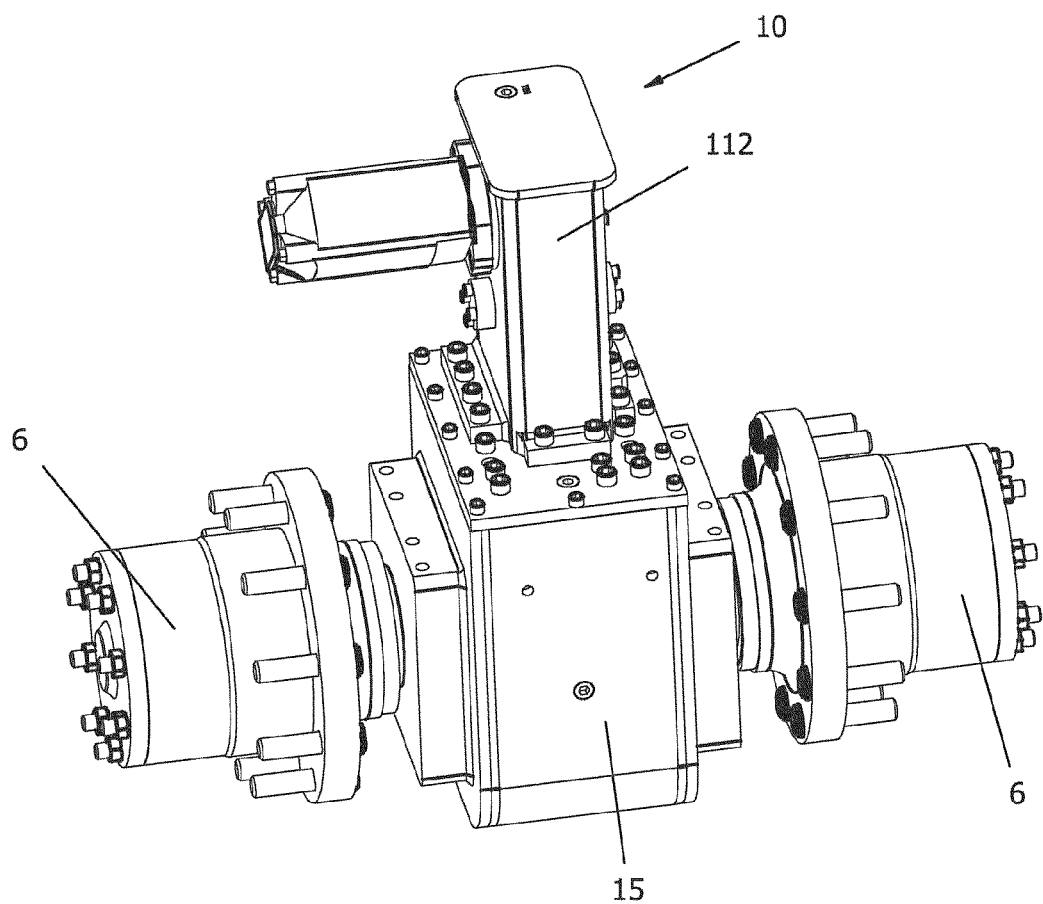
FIG. 2 is a schematic perspective view of the drive system of the disclosure with the wheels removed to reveal the hub mount.
Figure 3A:
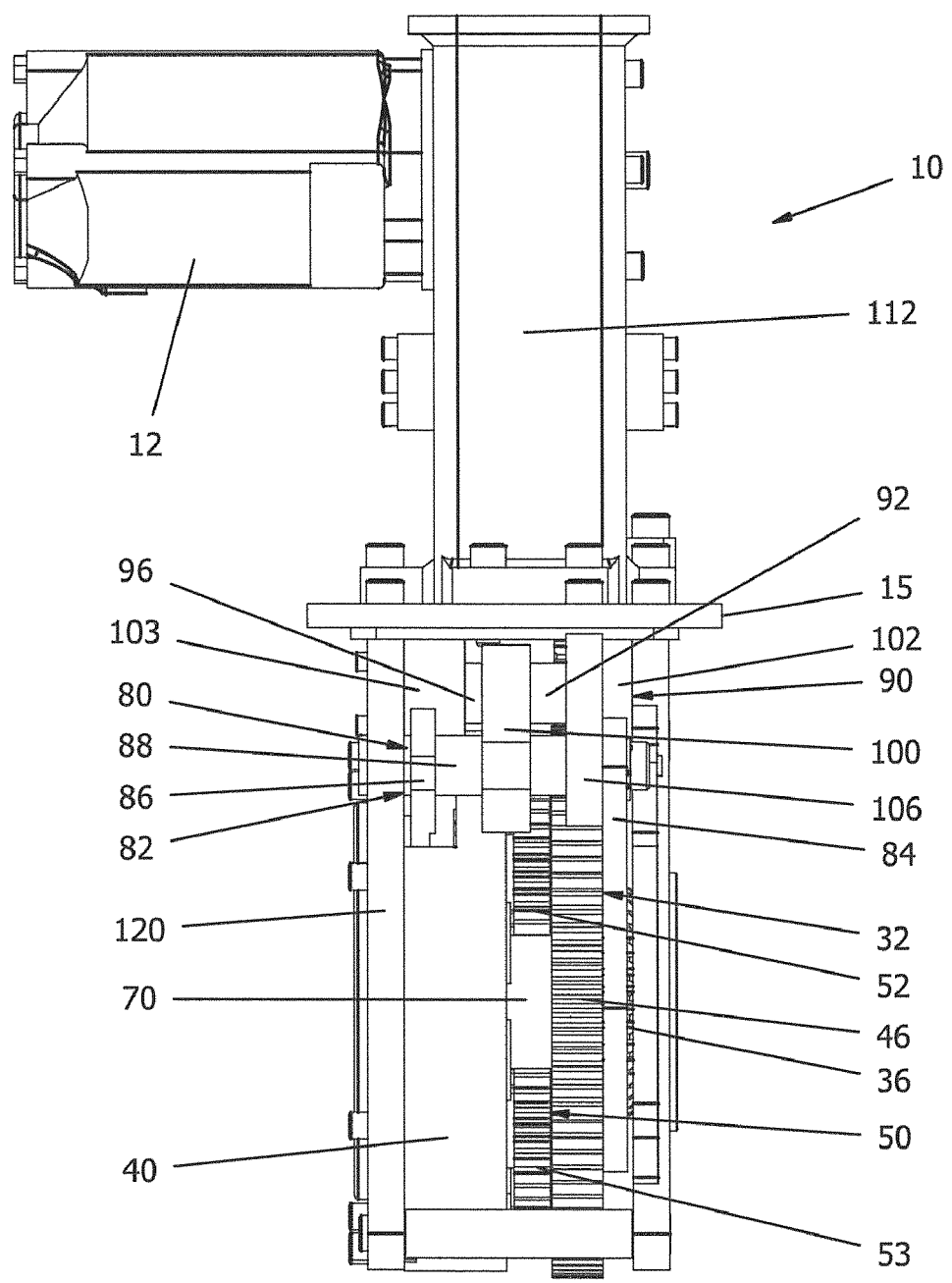
FIG. 3A is a schematic perspective view of the new drive system of the present disclosure with the primary housing removed to reveal detail of the frame, the final drive assembly, and the actuation structure, with the gear set being positioned in the engaged position.
Figure 3B:
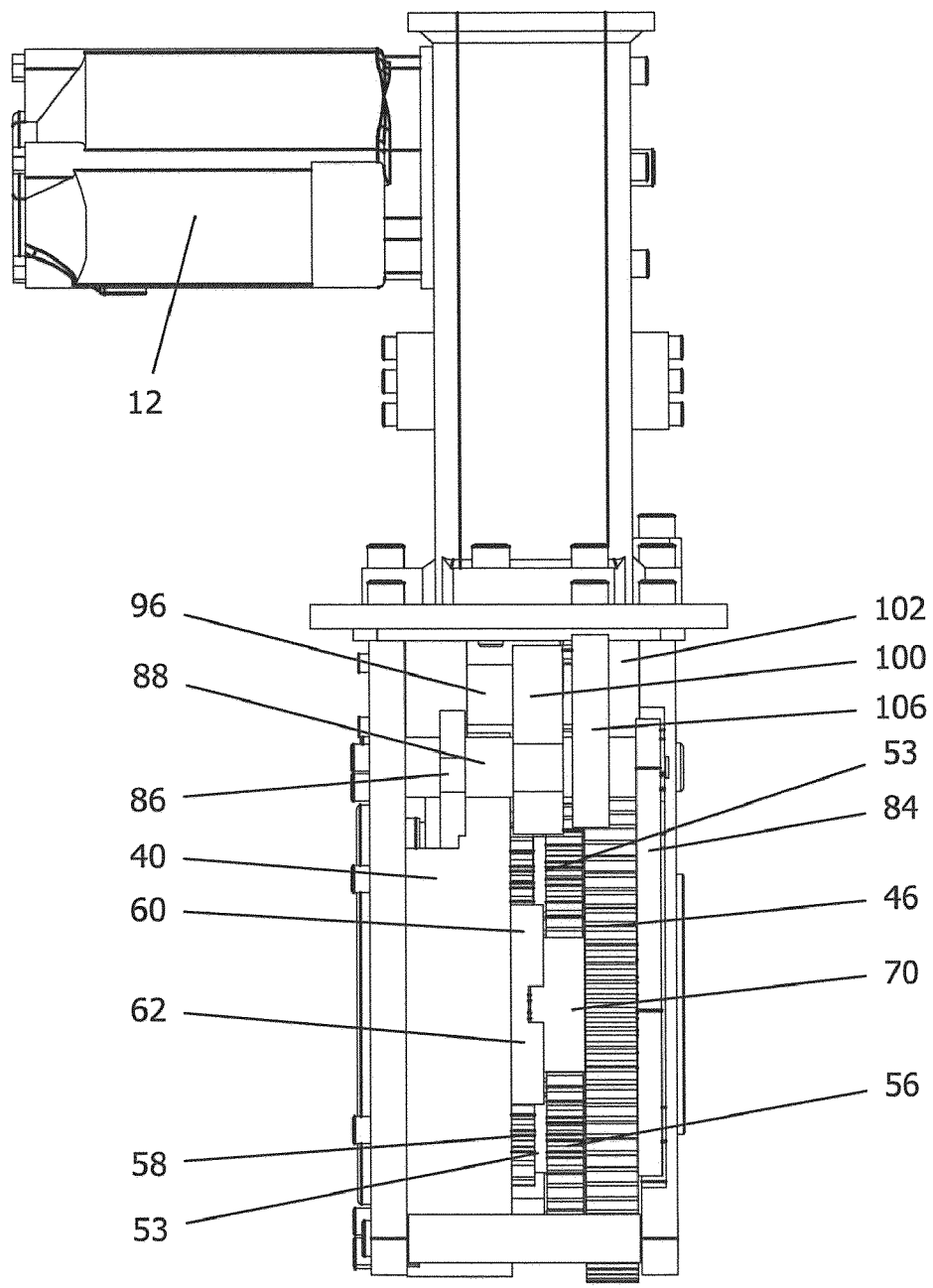
FIG. 3B is a schematic perspective view of the new drive system of the present disclosure with the primary housing removed to reveal detail of the frame, the final drive assembly, and the actuation structure, with the gear set being positioned in the disengaged position.

With reference now to the drawings, and in particular to FIGS. 1 through 6 thereof, a new drive system with low speed, high torque drive mode and freewheel mode embodying the principles and concepts of the disclosed subject matter will be described.

The disclosure generally relates to a drive system 10 that has many applications, and in the context of this disclosure will be illustratively described in combination with an axle 2 on which one or more wheels 4 are mounted, although it will be appreciated that other applications of the system 10 may be utilized. In the illustrative application, the axle 2 and wheels 4 support a trailer that is designed to be towed at highway speeds (e.g., greater than 40 miles per hour) and also is able to drive the wheels and move the trailer at a significantly slower speed, such as at a speed of greater than 0 miles per hour but less than approximately 5 miles per hour. To accommodate this range of speeds, particularly in which at one extreme the wheels are being driven and at the other extreme the wheels are being towed as a part of the trailer, the system utilizes a relatively low speed drive mode and a relatively high speed freewheel mode for trailing. The freewheel mode of the system is advantageous in that most parts of the drive system (e.g., any gears of the system used for speed reduction) are disengaged from rotation with the axle and the wheels. As a result, the rotation of the wheels and axles is not transferred to the gears in the freewheel mode, which can cause significant drag or resistance to rotation of the wheels, but probably more importantly can cause significant wear on the gears of the system, especially in those application in which the gears implement a significant degree of speed reduction. In some embodiments, such as described below, only one element of the drive system rotates with the axle in both the drive and freewheel modes, and in the freewheel mode, that one element is the only element (along with supportive bearings) that rotates, and it is not a gear element interlocked with other gear elements. The drive mode of the system 10 allows the axle and wheels to be driven at a relatively slow speed and at high torque levels, which is highly useful in applications such, for example, the lateral movement of a conveyor during stacking operations, although other applications may also be suitable.

In one illustrative application of the drive system 10, the system 10 is employed to selectively rotate the axle 2 and wheels 4 attached to the axle by suitable hub mounts 6. The drive system 10 may include a primary housing 15 that defines an interior in which, for example, a plurality of gears and a lubricating fluid may be located. The axle 2 may extend into, and may suitably pass through, a portion of the primary housing 15 so that the axle may be acted upon by the elements of the drive system. The system 10 may also include suitable bearings for supporting the axle 2 that are known to those skilled in the art and will not be further described here.

The drive system 10 may include a motor 12 to generate the rotational movement for the drive mode. The motor 12 may be hydraulically operated, although other means of powering the motor may be employed, including, for example, electricity. The motor 12 typically has an output shaft 14 to communicate the rotation to external elements. Through the speed reduction and the torque increase that is accomplished through some embodiments of the drive system 10, the motor 12 may be relatively small in size and power.

Figure 6A:
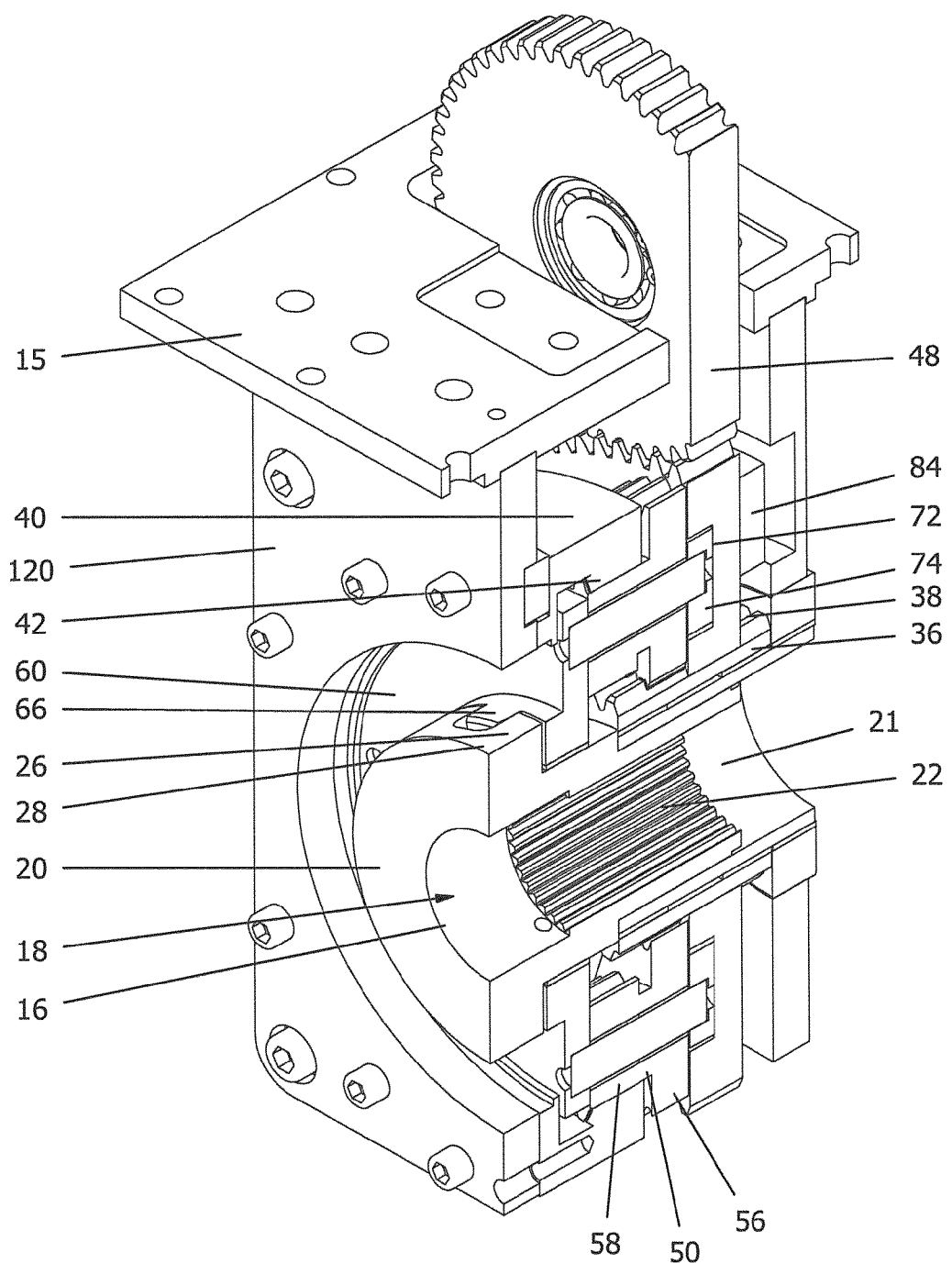
FIG. 6A is a schematic perspective sectional view of the new drive system of the present disclosure with the a portion of the primary housings removed to reveal detail of the primary drive assembly, with the gear set being positioned in the engaged position.
Figure 6B:
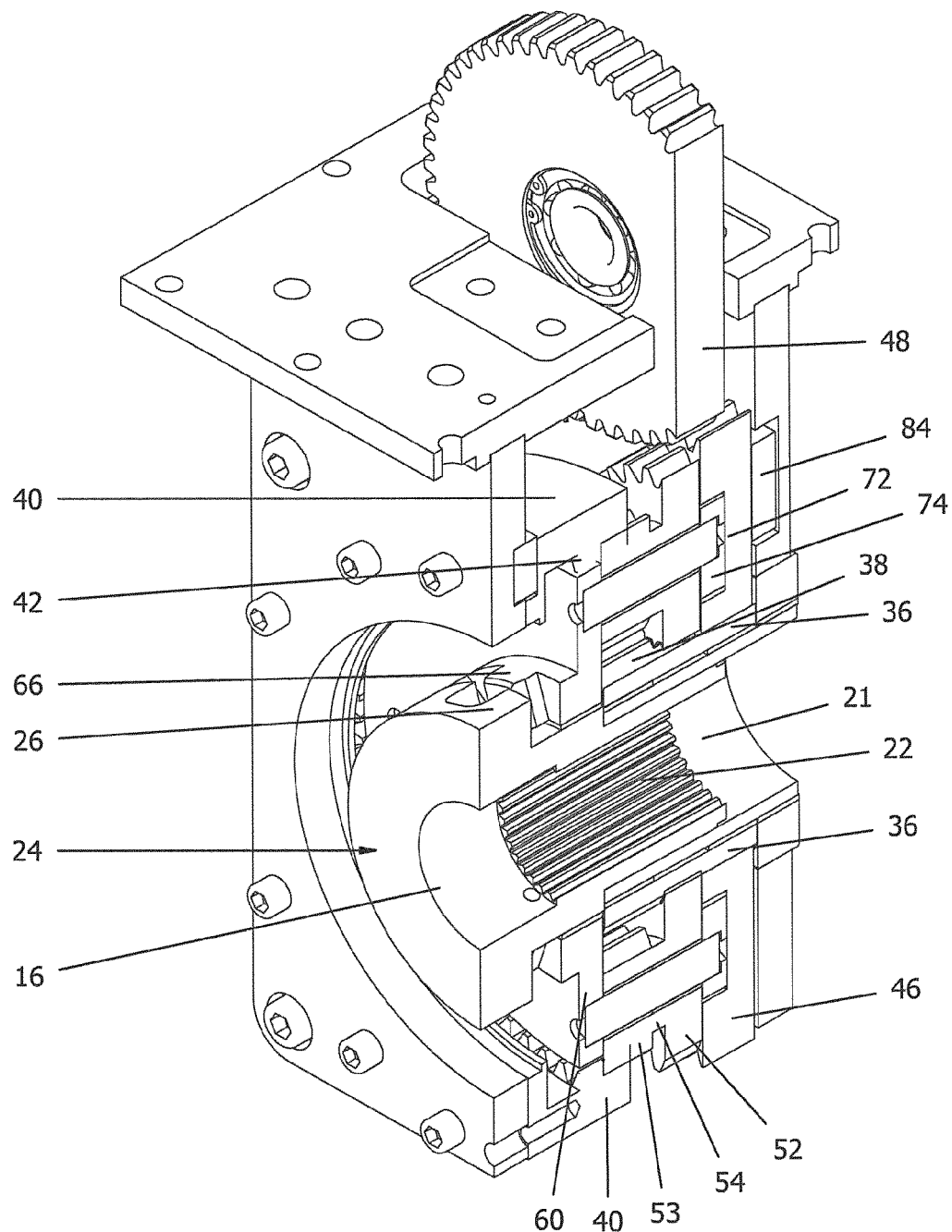
FIG. 6B is a schematic perspective sectional view of the new drive system of the present disclosure with the a portion of the primary housings removed to reveal detail of the primary drive assembly, with the gear set being positioned in the disengaged position.

Another aspect of the drive system 10 may be a final transfer element 16 that functions to interface with the drive axle 2 (see FIGS. 6A and 6B). The final transfer element 16 may be rotatable with respect to the primary housing 15. The final transfer element 16 may be configured to receive a portion of the drive axle 12, and may be configured to permit the drive axle 2 to pass through the final transfer element. The final transfer element 16 may define an aperture 18 that is configured to receive the axle 2, and the aperture may extend through the final transfer element such that the axle 2 is able to extend through the final transfer element. The final transfer element 16 and the axle 2 may be rotatable about a common axis, and the axis about which the final transfer element rotates may be considered as an axial direction as a point of reference for this description.

In some embodiments of the system 10, the final transfer element 16 may comprise an elongate sleeve having opposite ends 20, 21 with openings located at each of the opposite ends. The axle 2 may be inserted through one of the openings and then passed through the opposite one of the openings. In the illustrative embodiments, the axle 2 is thus able to support a wheel 4 on each side of the drive system 10 is a relatively compact arrangement, although those skilled in the art will recognize that the system could be structured so that an axle only extends from one side of the drive system and only drives one wheel.

The final transfer element 16 may include at least one engaging element 22 that engages the axle 2 so that the axle turns with the final transfer element. The engaging element 22 may extend from the final transfer element 16 in an inward direction into the aperture 18 of the transfer element 16, and may comprise a spline, or a plurality of splines that are circumferentially spaced about the aperture 18. Other suitable means of causing the final transfer element 16 and the axle to turn together may be employed, such as, for example, a key and keyway.

Embodiments of the final transfer element 16 may include a first interlock structure 24 for selectively interlocking with a second interlocking structure that will be described later in this disclosure. The first interlock structure 24 may include a plurality of teeth 26 which may extend in an axial direction of the transfer element 16 and may be circumferentially spaced about the transfer element. The first interlock structure 24 may also include a flange 28 that extends outwardly from the sleeve, and the plurality of teeth 26 may extend from the flange in an axial direction. As will become apparent, the first and second interlock structures may form the means for transferring rotation to the final transfer element 16, as well as isolating the rotation of the transfer element 16 from other elements of the system 10.

The drive system 10 may also include a final drive assembly 30 that is connected to the final transfer element 16 to drive the drive axle 2 when the drive axle 2 is received by the final transfer element. The final drive assembly 30 may have an engaged condition in which power is transferred through the final drive assembly to the final transfer element 16 and the drive axle 2, and may also have a disengaged condition in which power is not transferred through the final drive assembly to the final transfer element 16 and drive axle 2. The disengaged condition may also be characterized by the final drive assembly 30 being substantially rotationally stationary regardless of any rotation of the final transfer element 16 or a drive axle 2 connected to the final transfer element. The engaged condition may correspond to the drive mode of the drive system 10, and the disengaged condition may correspond to the freewheel mode of the system 10. The final drive assembly 30 may provide a rotational speed reduction and a corresponding torque increase, although this is not critical to the function of the system 10.

The final drive assembly 30 may include a gear set 32 that is selectively engagable with the final transfer element 16 so that rotation of the gear set 32 is transferred to the final transfer element. The gear set 32 is also selectively disengageable from the final transfer element 15 so that rotation of the gear set is not transferred to the final transfer element and conversely rotation of the final transfer element is not transferred to the gear set.

The gear set 32 is positioned adjacent to the final transfer element 16 and is movable with respect to the final transfer element. More specifically, the gear set 32 may be movable between an engaged position (see FIGS. 3A, 4A and 6A) and a disengaged position (see FIGS. 3B, 4B and 6B). The engaged position may be characterized by the gear set 32 being engaged with the final transfer element 16 and the disengaged position may be characterized by the gear set 32 being disengaged from the final transfer element. The engaged position of the gear set 32 may correspond to the engaged condition of the final drive assembly 30, as well as the drive mode of the system 10, and the disengaged position of the gear set 32 may correspond to the disengaged condition of the final drive assembly, as well as the freewheel mode of the system 10.

The gear set 32 may be slidable between the engaged position and the disengaged positions, such as by movement in an axial direction of the final transfer element. The final transfer element 16 may extend through an open center of the gear set 32, and the gear set 32 may be slidable over the final transfer element.

The drive system 10 may further include an intermediate transfer element 36, which may transfer rotation between gears in the gear set 32 but is not a part of the gear set and the gear set may be movable with respect to the intermediate transfer element, although this is not a critical relationship. The final transfer element 16 may extend through the intermediate transfer element 36, and the intermediate transfer element may rotate freely (or not rotate) with respect to the final transfer element. The intermediate transfer element 36 may have a substantially cylindrical inner surface, and in some embodiments the intermediate transfer element 36 is journalled on the final transfer element 16 with one or more bearings being positioned between the intermediate 36 and final 16 transfer elements.

The gear set 32 may be slidable with respect to the intermediate transfer element 36 in the axial direction of the final transfer element 16. The intermediate gear element may extend through at least a portion of the gear set. The intermediate transfer element 36 has an outer surface which may be substantially cylindrical and may include a plurality of splines 38 or elongated teeth formed on the outer surface. The plurality of splines 38 may engage at least a portion of the elements of the gear set 32 such that the engaged elements of the gear set rotate with the intermediate transfer element 36 and each other.

The drive system 10 may also include an auxiliary transfer element 40 which may engage at least a portion of the elements of the gear set 32. The auxiliary transfer element 40 may be held rotationally stationary with respect to the gear set 32 when the gear set is rotating. The auxiliary transfer element 40 may also be secured against axial movement when the gear set 32 moves between the engaged and disengaged positions. For example, the auxiliary transfer element 40 may be mounted on the primary housing 15 and may be located in the interior of the primary housing.

The auxiliary transfer element 40 may include in inner annular surface, and the inner annular surface may include a plurality of teeth 42 extending inwardly from the inner annular surface. Illustratively, the auxiliary transfer element 40 comprises a ring gear and the plurality of teeth 42 of the ring gear comprises spur cut teeth to permit axial sliding of the planet gears of the second gear element of the gear set 32 with respect to the teeth of the ring gear.

In an illustrative embodiment of the gear set 32, the gear set provides speed reduction and a corresponding increase in torque, although that function is not critical to the operation of the system 10. The illustrative gear set 32 provides a highly compact configuration that is easily removed and replaced in the primary housing 15 for servicing upon removal of the axle. The illustrative gear set 32 may comprise a plurality of gear elements for transferring the rotational movement, and may produce the speed reduction and torque increase. Significantly, the gear elements of the gear set may be movable or shiftable as a unit in the axial direction of, for example, the final transfer element 16.

Figure 4A:
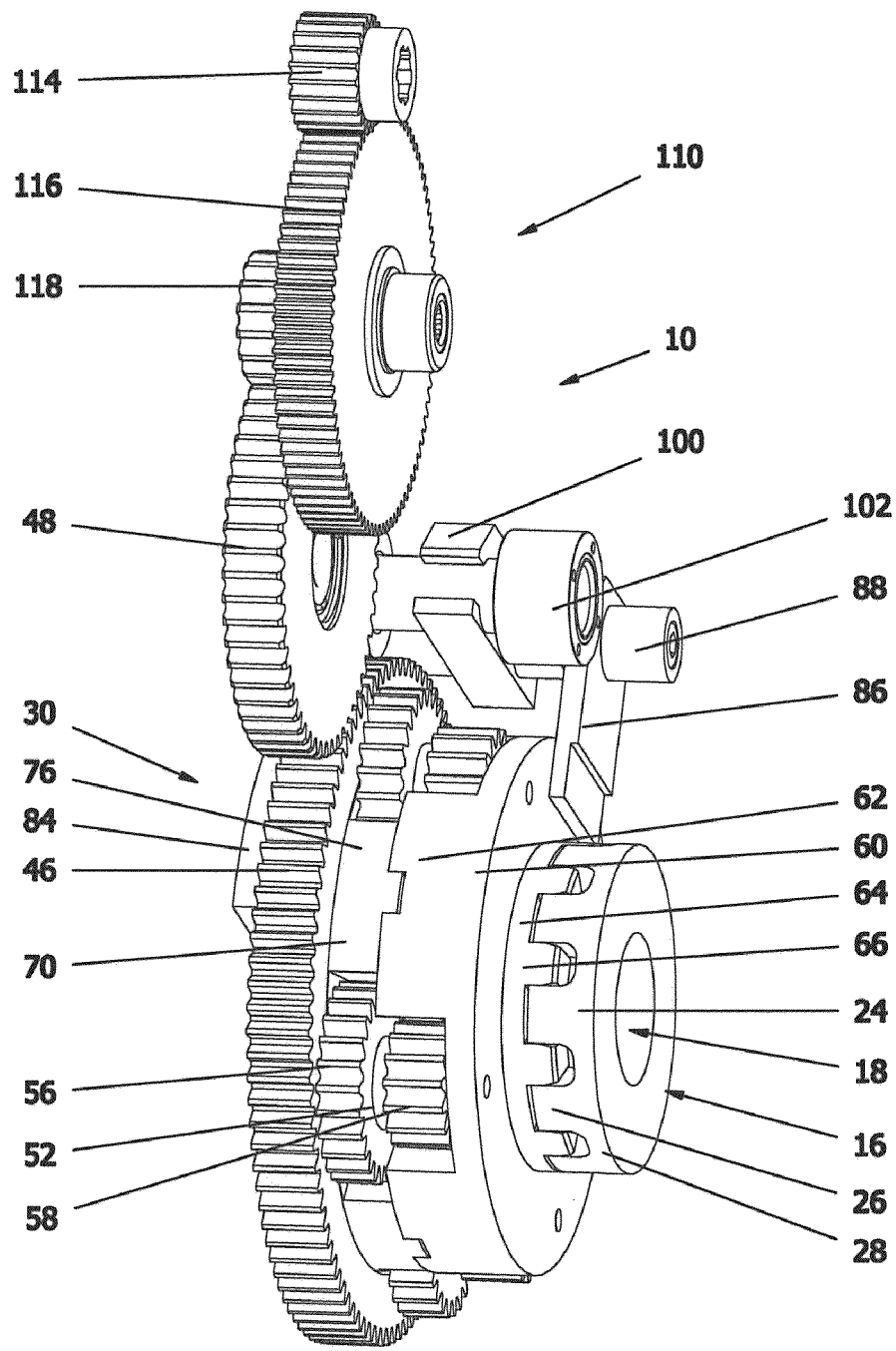
FIG. 4A is a schematic perspective view of the new drive system of the present disclosure with the primary and secondary housings removed to reveal detail of the primary and preliminary drive assemblies, and the actuation structure, with the gear set being positioned in the engaged position.
Figure 4B:
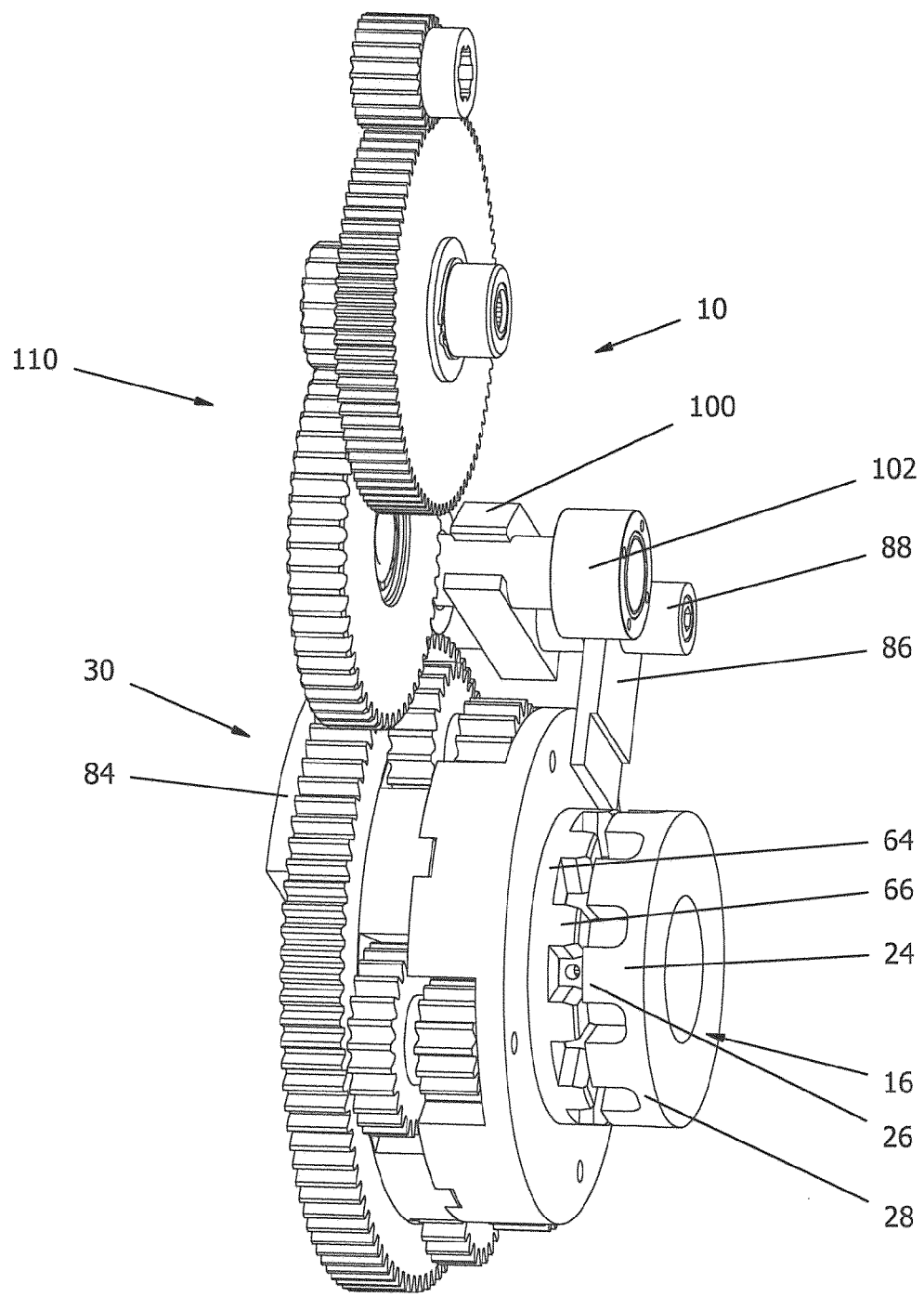
FIG. 4B is a schematic perspective view of the new drive system of the present disclosure with the primary and secondary housings removed to reveal detail of the primary and preliminary drive assemblies, and the actuation structure, with the gear set being positioned in the disengaged position.
Figure 5:
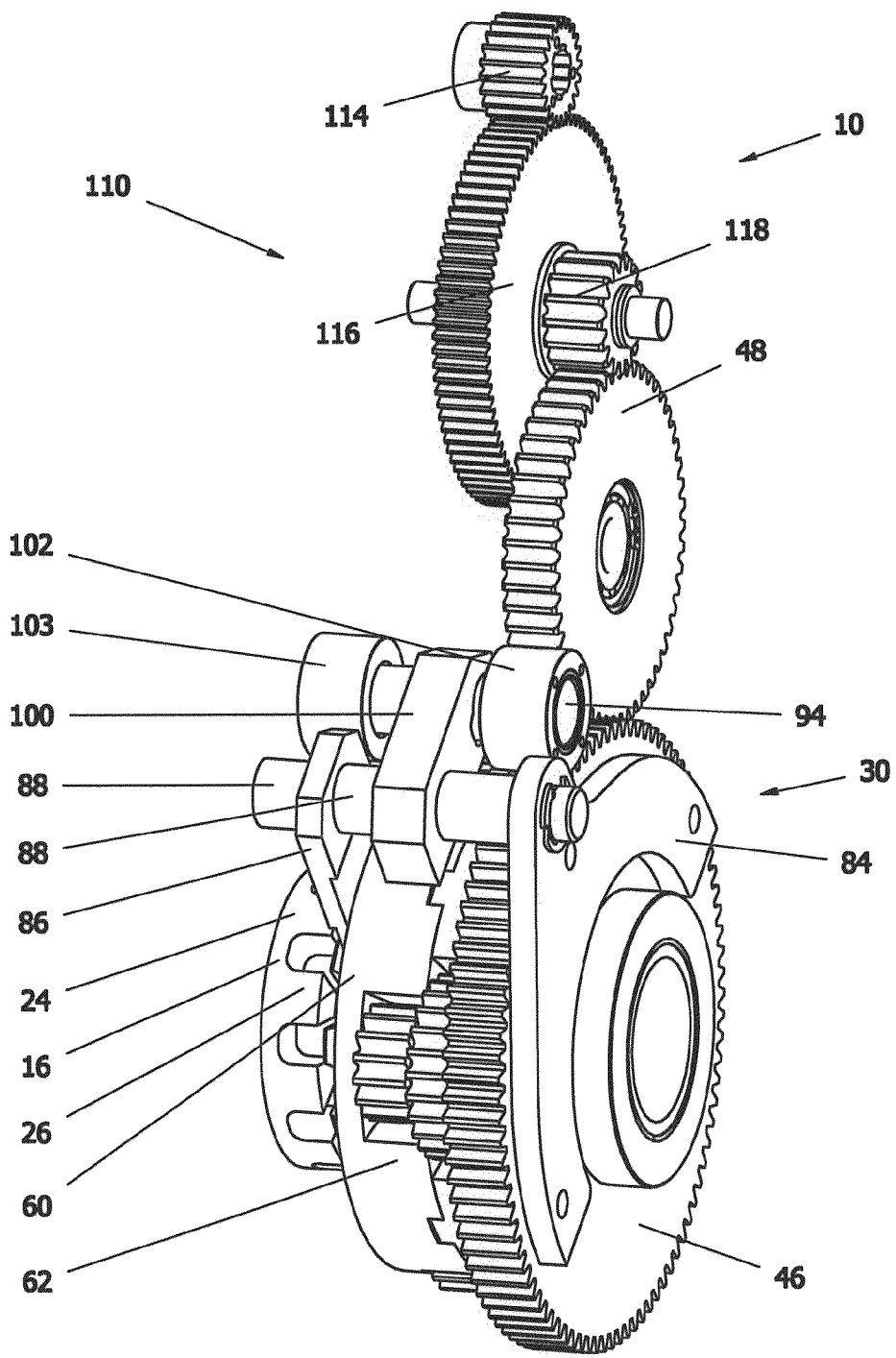
FIG. 5 is a schematic perspective view of the new drive system of the present disclosure with the primary and secondary housings removed to reveal detail of the primary and preliminary drive assemblies, and the actuation structure, with the gear set being positioned in the disengaged position.

The gear set 32 may illustratively include a first gear element 46 for receiving rotational input from an input gear 48 with which it is engaged. The first gear element 46 may be movable as a part of the gear set 32 with respect to the input gear 48 such that movement of the first gear element 46 shifts the location of a contact area between the first gear element 46 and the input gear 48. This is illustrated in FIG. 4A and FIG. 4B, which show the change in relationship between the first gear element 46 and the input gear 48 when the gear set is in the engaged position (see FIG. 4A) and the disengaged position (see FIG. 4B).

The first gear element 46 may be further engaged with the intermediate transfer element 36 such that the intermediate transfer element turns with the first gear element 46. Rotation of the first gear element 46 thus produces rotation of the intermediate transfer element 36 with respect to the final transfer element 16. The first gear element 46 may remain in engagement with the intermediate transfer element 36 in both the engaged and disengaged positions of the gear set. The intermediate transfer element 36 may extend through the first gear element 46, and the intermediate transfer element may act as a guide for the movement of the first gear element as the gear set moves between the positions. The final transfer element 16 may also extend through the first gear element 46, but the first gear element does not turn with the final transfer element (although both may simultaneously rotate).

In the illustrative embodiments, the first gear element 46 comprises a gear, and preferably comprises a gear with spur teeth that allows the first gear element to axially shift with respect to the input gear 48, which may also have spur teeth to facilitate the sliding.

The gear set 32 may also include a second gear element 50 for receiving rotational input from the first gear element 46, and in the illustrative embodiments, the rotational input is transferred from the first gear element 46 to the second gear element 50 through the intermediate transfer element 36. The second gear element 50 may be positioned about the intermediate transfer element to engage and receive power from the intermediate transfer element.

Illustratively, the second gear element 50 may comprise a plurality of planet gears 52, 53, and each of the planet gears may be engaged with the intermediate transfer element 36 which may effectively act as the sun gear for the planet gears. The second gear element 50 may include four of the planet gears 52, 53, although those skilled in the art will recognize that more or fewer of the gears may be employed. The planet gears 52, 53 may thus orbit the intermediate transfer element 36 as the transfer element 36 rotates and thereby cause the planet gears 52, 53 to rotate about their respective axis as well as move in a circular path about the transfer element 36. Each of the planet gears 52, 53 may rotate on a respective carrier shaft 54.

The planet gears 52, 53 may not only engage the intermediate gear element 46, but may also engage the auxiliary transfer element 40. In some embodiments of the system 10, each of the planet gears may have two gear portions. A first one 56 of the gear portions may engage the intermediate transfer element 36, and a second one 58 of the gear portions may engage the auxiliary transfer element 40. The first gear portion 56 and the second gear portion 58 may be fixed together to rotate at the same rotational speed. The first gear portion 56 may have a first diameter and the second gear portion 58 may have a second diameter, with the first diameter of the first gear portion being greater than the second diameter for the second gear portion.

Movement of the gear set 32 between the engaged position and the disengaged position shifts the location of the contact area of the planet gears 52, 53 with the auxiliary transfer element 40, which does not move with the gear set. The movement of the gear set 32 between the engaged and disengaged positions also shifts the contact area of the planet gears with the intermediate transfer element, which also does not movement with the gears set. However, the planet gears 52, 53 remain engaged with the intermediate transfer element 36 and the auxiliary transfer element 40 in both of the engaged and disengaged positions.

The gears set 32 may further include a carrier element 60 that is rotated by the second gear element 50. The carrier element 60 may engage the second gear element 50, or each of the planet gears 52, 53 of the second gear element. Each of the planet gears 52, 53 may be rotatably mounted on the carrier element 60 by the respective carrier shaft 54. The carrier element 60 may be journalled on the final transfer element 16 by a bearing. The carrier element 60 may include fingers 62 that extend outwardly and between portions of the planet gears 52, 53.

The carrier element 60 may further include a second interlock structure 64 for selectively interlocking with the first interlock structure 24 on the final transfer element 16 so that the carrier element and the final transfer element are able to rotate together or independently of each other. The second interlock structure 64 may comprise a plurality of teeth 66 which are arranged in a manner that is complementary to the plurality of teeth 26 of the first interlock structure 24. Axial movement of the gear set 32, including the second interlock structure 64, toward the first interlock structure 24 moves the teeth of the interlock structures into engagement with each other, allowing the gear set to rotate the final transfer element 16. Conversely, axial movement of the gear set 32 and the second interlock structure 64 away from the first interlock structure 24 moves the teeth of the interlock structures out of engagement with each other, and the final transfer element 16 is able to turn freely with respect to the gear set 32 and the gear set is able to turn freely with respect to the final transfer element.

The gear set 32 may also include a carrier ring 70 that at least partially supports the second gear element 50, and more specifically the planet gears 52, 53 of the second gear element (see FIGS. 6A and 6B). The carrier ring 70 receives an end of the carrier shaft 54 of each of the planet gears 52, 53 of the second gear element, while the other, opposite end of the carrier shaft is received in the carrier element 60. The carrier ring 70 may be at least partially positioned in an annular channel 72 formed in the first gear element 46 so that the first gear element provides support for the annular ring 70 and the planet gears 52, 53. The carrier ring 70 rotates freely with respect to the first gear element 46 so that the carrier ring and the first gear element may rotate at different speeds. The carrier ring 70 may include a base portion 74 that may be at least partially nested in the annular channel 72, and may further include one or more extension portions 74 that extend outwardly from the base portion 74. The extension portions 76 may abut and interlock with the fingers 62 of the carrier element 60, so that the carrier ring 70 rotates with and at the same speed as the carrier element 60.

The drive system 10 may also include a movement assembly 80 that is configured to move the gear set 32 between the engaged position and the disengaged position when it is desired to switch the drive system between the drive mode and the freewheel mode. The movement assembly 80 may include a shifting structure 82 that is configured to contact the gear set 32 to move the gear set between the engaged and disengaged positions. The shifting structure 82 may have a first position that corresponds to the engaged position of the gear set 32 and a second position that corresponds to the disengaged position of the gear set.

The shifting structure 82 may include a first fork 84 configured to move the gear set 32 toward the engaged position of the gear set. The first fork may be configured to contact a first end of the gear set, such as contacting the first gear element 46. The shifting structure 80 may further include a second fork 86 that is configured to move the gear set 32 toward the disengaged position of the gear set. The second fork 86 may be configured to contact a second end of the gear set, such as, for example, the carrier element 60. The first 84 and second 86 forks are thus configured to apply force to the gear set 32 in opposite axial directions. The shifting structure 82 may also include a shift rod 88 that is configured to move the first fork 84 and the second fork 86 between the positions. The first fork 84 may be mounted on the shift rod 88, and the second fork 86 may also be mounted on the shift rod. The shift rod 88 may be longitudinally shiftable or movable in an axial direction to thereby produce the axial movement of the forks 84, 86.

The movement assembly 80 may also include an actuation structure 90 that is configured to move the shifting structure 82 between the position corresponding to engaged position of the gear set, and the position corresponding to the disengaged position of the gear set. The actuation structure 90 may be movable between first and second positions, with the first position of the actuating structure 90 corresponding to the first position of the shifting structure 82 and the second position of the actuating structure corresponding to the second position of the shifting structure. The actuation structure 90 may be hydraulically actuatable, although other means for actuating the structure 90 may be utilized.

The actuating structure 90 may include a piston rod member 92, and the piston rod member may include a pair of piston portions 94 and a rod portion 96 that connects the piston portions together. The actuating structure may further include a connector member 100 that connects the piston rod member 92 to the shift rod 88 of the shifting structure 82, so that movement of the piston rod member 92 is transferred to the shift rod 88 of the shifting structure. The actuating structure 90 may further comprise a pair of hydraulic chambers 102, 103. Each of the piston portions 94 may be positioned in one of the hydraulic chambers such that introduction of fluid into one of the chambers 102, 103 exerts pressure against the respective piston portion of the piston rod member 92 and causes longitudinal movement of the piston rod member 92 and thus causes corresponding movement of the shifting structure 82. The fittings and conduits for moving the fluid into and out of the chambers is not illustrated, but the manners in which the movement of fluid into and out of the chambers will be recognized by one of ordinary skill in the art.

The movement assembly 90 may further include a support structure 106 that is configured to support the shifting structure 82. The shift rod 88 of the shifting structure 82 may pass through an aperture in the support structure 106. The support structure 106 may be mounted on the primary housing 15.

In some embodiments of the drive system, and in the illustrative embodiments described here, the drive system 10 includes a preliminary drive assembly 110 for transferring power from the motor 12 to the final drive assembly 30. The preliminary drive assembly 110 may be located in a secondary housing 112, which may be mounted on the primary housing 15, and in the illustrative embodiment is mounted on the top of the primary housing, although other configurations may be employed. The preliminary drive assembly 110 may provide a rotational speed reduction, and a corresponding torque increase, between the motor 12 and the final drive assembly 30. Thus, a degree of speed reduction may be performed by the preliminary drive assembly 110 and a degree of speed reduction may be performed by the final drive assembly 30.

Some embodiments of the preliminary drive assembly 110 may include a first drive gear 114 that is mounted on the motor 12. The preliminary drive assembly 110 may further comprise a second drive gear 116 that engages the first drive gear 114 such that the second drive gear is capable of being rotated by the first drive gear. The diameter sizes of the first 114 and second 116 drive gears may be such that the second drive gear rotates at a slower rotational speed than the first drive gear when the first drive gear rotates the second drive gear. The preliminary drive assembly may also include a third drive gear 118 turning with the second drive gear 116, and the third drive gear may be connected to the second drive gear such that the third drive gear rotates at the same rotational speed as the second drive gear. The third drive gear 118 may rotates about the same axis as the second drive gear. The second drive gear may have a diameter size that is greater than a diameter size of the third drive gear. The preliminary drive assembly 110 may further include a fourth drive gear 48 that acts as the input gear previously referred to. The fourth drive gear 48 engages the third drive gear 118 such that the fourth drive gear is capable of being rotated by the third drive gear. The sizes of the third 118 and fourth 48 drive gears may be such that the fourth drive gear rotates at a slower rotational speed than the third drive gear when the third drive gear rotates the fourth drive gear. The fourth drive gear 48 may partially protrude from the secondary housing 112 and into the interior of the primary housing 15, so that the gear 48 may engage the gear set 32.

A frame 120 may be removably mounted in the interior of the primary housing 15 for support various elements of the drive system 10, such as the bearings supporting the final transfer element 16. The frame 120 may also facilitate the removal of the final drive assembly and other components of the drive system from the primary housing as a unit for servicing.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

The invention claimed is:

1. A drive system with a drive mode and freewheel mode, comprising:
   a motor configured to generate rotational movement;
   a final transfer element configured to receive and rotate with a drive axle; and
   a final drive assembly in rotational communication with the motor, the final drive assembly being selectively engageable with the final transfer element to drive a drive axle when the drive axle is received by the final transfer element, the final drive assembly having an engaged condition in which power is transferred through the final drive assembly to the final transfer element and a disengaged condition in which power is not transferred through the final drive assembly to the final transfer element;
   wherein the final drive assembly comprises a gear set positioned adjacent to the final transfer element, the gear set being selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set;
   wherein at least one of the final drive assembly and the final transfer element is axially movable with respect to each other between the engaged condition and the disengaged condition.

2. The system of claim 1 wherein the disengaged condition of the final drive assembly is characterized by the final drive assembly being substantially rotationally stationary regardless of any rotation of the final transfer element or a drive axle connected to the final transfer element.

3. The system of claim 1 wherein the final transfer element is configured such that a drive axle is capable of passing through the final transfer element.

4. The system of claim 1 wherein the final drive assembly includes an intermediate transfer element configured to transfer rotation between gears in the gear set, the gear set being axially movable with respect to the intermediate transfer element.

5. The system of claim 1 wherein the gear set comprises:
   a first gear element for receiving rotational input from an input gear, the first gear element being engaged with an intermediate transfer element such that the intermediate transfer element turns with the final transfer element;
   a second gear element for receiving rotational input from the intermediate transfer element; and
   a carrier element rotated by the second gear element.

6. The system of claim 5 wherein the final transfer element includes a first interlock structure;
   wherein the carrier element includes a second interlock structure for selectively interlocking with the first interlock structure; and
   wherein the second interlock structure is movable into engagement with the first interlock structure to engage the gear set with the final transfer element and is movable out of engagement with the first interlock structure to disengage the gear set from the final transfer element.

7. The system of claim 1 wherein the final transfer element includes a first interlock structure and the gear set includes a second interlock structure for selectively interlocking with the first interlock structure; and
   wherein the second interlock structure is movable into engagement with the first interlock structure to engage the gear set with the final transfer element and is movable out of engagement with the first interlock structure to disengage the gear set from the final transfer element.

8. The system of claim 1 wherein the final drive assembly is configured to provide a rotational speed reduction and corresponding torque increase between an input gear and the final transfer element.

9. The system of claim 1 further comprising a preliminary drive assembly, the preliminary drive assembly transferring power from the motor to the final drive assembly, the preliminary drive assembly being configured to provide a rotational speed reduction and corresponding torque increase between the motor and the final drive assembly.

10. A drive system with a drive mode and freewheel mode, comprising:
    a motor configured to generate rotational movement;
    a final transfer element configured to receive and rotate with a drive axle; and
    a final drive assembly in rotational communication with the motor, the final drive assembly being selectively engageable with the final transfer element to drive a drive axle when the drive axle is received by the final transfer element, the final drive assembly having an engaged condition in which power is transferred through the final drive assembly to the final transfer element and a disengaged condition in which power is not transferred through the final drive assembly to the final transfer element;
    wherein the final drive assembly comprises a gear set positioned adjacent to the final transfer element, the gear set being selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set; and
    wherein the final transfer element extends through the gear set, the gear set being slidable on the final transfer element between an engaged position and a disengaged position.

11. The system of claim 10 wherein the final drive assembly is configured to provide a rotational speed reduction and corresponding torque increase between an input gear and the final transfer element.

12. The system of claim 10 further comprising a preliminary drive assembly, the preliminary drive assembly transferring power from the motor to the final drive assembly, the preliminary drive assembly being configured to provide a rotational speed reduction and corresponding torque increase between the motor and the final drive assembly.

13. A drive system with a drive mode and freewheel mode, comprising:
    a motor configured to generate rotational movement;
    a final transfer element configured to receive and rotate with a drive axle; and
    a final drive assembly in rotational communication with the motor, the final drive assembly being selectively engageable with the final transfer element to drive a drive axle when the drive axle is received by the final transfer element, the final drive assembly having an engaged condition in which power is transferred through the final drive assembly to the final transfer element and a disengaged condition in which power is not transferred through the final drive assembly to the final transfer element;
    wherein the final drive assembly comprises a gear set positioned adjacent to the final transfer element, the gear set being selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set;
    wherein the gear set is movable between an engaged position and a disengaged position, the engaged position being characterized by the gear set being engaged with the final transfer element and the disengaged position being characterized by the gear set being disengaged from the final transfer element; and
    a movement assembly configured to move the gear set between the engaged position and the disengaged position.

14. The system of claim 13 wherein the movement assembly includes:
    a shifting structure configured to contact the gear set to move the gear set; and
    an actuation structure configured to move the shifting structure between the engaged position and the disengaged position.

15. A drive system with a drive mode and freewheel mode, comprising:
    a motor configured to generate rotational movement;
    a final transfer element configured to receive and rotate with a drive axle; and
    a final drive assembly in rotational communication with the motor, the final drive assembly being selectively engageable with the final transfer element to drive a drive axle when the drive axle is received by the final transfer element, the final drive assembly having an engaged condition in which power is transferred through the final drive assembly to the final transfer element and a disengaged condition in which power is not transferred through the final drive assembly to the final transfer element;

wherein the final drive assembly comprises a gear set positioned adjacent to the final transfer element, the gear set being selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set;

wherein the final drive assembly includes an intermediate transfer element configured to transfer rotation between gears in the gear set, the gear set being movable with respect to the intermediate transfer element;

wherein the final transfer element extends through the intermediate transfer element and the intermediate gear element extends through at least a portion of the gear set, the intermediate transfer element rotating freely with respect to the final transfer element, the gear set being slidable with respect to the intermediate transfer element in an axial direction of the intermediate transfer element.

16. A drive system with a drive mode and freewheel mode, comprising:

a motor configured to generate rotational movement;

a final transfer element configured to receive and rotate with a drive axle; and a final drive assembly in rotational communication with the motor, the final drive assembly being selectively engageable with the final transfer element to drive a drive axle when the drive axle is received by the final transfer element, the final drive assembly having an engaged condition in which power is transferred through the final drive assembly to the final transfer element and a disengaged condition in which power is not transferred through the final drive assembly to the final transfer element;

wherein the final drive assembly comprises a gear set positioned adjacent to the final transfer element, the gear set being selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set; and wherein the final drive assembly further comprises an auxiliary transfer element, the auxiliary transfer element engaging at least a portion of the elements of the gear set, the auxiliary transfer element being rotationally stationary with respect to the gear set when the gear set is rotating the auxiliary transfer element being stationary when the gear set moves, the gear set remaining engaged with the auxiliary transfer element when the gear set moves between an engaged position and a disengaged position.

17. A drive system with a drive mode and freewheel mode, comprising:

a motor configured to generate rotational movement;

a final transfer element configured to receive and rotate with a drive axle; and a final drive assembly in rotational communication with the motor, the final drive assembly being selectively engageable with the final transfer element to drive a drive axle when the drive axle is received by the final transfer element, the final drive assembly having an engaged condition in which power is transferred through the final drive assembly to the final transfer element and a disengaged condition in which power is not transferred through the final drive assembly to the final transfer element;

wherein the final drive assembly comprises a gear set positioned adjacent to the final transfer element, the gear set being selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set;

wherein the gear set comprises:

a first gear element for receiving rotational input from an input gear, the first gear element being engaged with an intermediate transfer element such that the intermediate transfer element turns with the final transfer element;

a second gear element for receiving rotational input from the intermediate transfer element; and a carrier element rotated by the second gear element; and wherein the second gear element comprises a plurality of planet gears, each of the planet gears being engaged with the intermediate transfer element.

18. A drive system with a drive mode and freewheel mode, comprising:

a motor configured to generate rotational movement;

a final transfer element configured to receive and rotate with a drive axle; and a final drive assembly in rotational communication with the motor, the final drive assembly being selectively engageable with the final transfer element to drive a drive axle when the drive axle is received by the final transfer element, the final drive assembly having an engaged condition in which power is transferred through the final drive assembly to the final transfer element and a disengaged condition in which power is not transferred through the final drive assembly to the final transfer element;

wherein the final drive assembly comprises a gear set positioned adjacent to the final transfer element, the gear set being selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set;

wherein the gear set comprises:

a first gear element for receiving rotational input from an input gear, the first gear element being engaged with an intermediate transfer element such that the intermediate transfer element turns with the final transfer element;

a second gear element for receiving rotational input from the intermediate transfer element; and a carrier element rotated by the second gear element; and wherein the first gear element is movable as a part of the gear set with respect to the input gear such that movement of the first gear element shifts the location of a contact area between the first gear element and the input gear.

19. A drive system with a drive mode and freewheel mode, comprising:
- a motor configured to generate rotational movement;
- a final transfer element configured to receive and rotate with a drive axle; and
- a final drive assembly in rotational communication with the motor, the final drive assembly being selectively engageable with the final transfer element to drive a drive axle when the drive axle is received by the final transfer element, the final drive assembly having an engaged condition in which power is transferred through the final drive assembly to the final transfer element and a disengaged condition in which power is not transferred through the final drive assembly to the final transfer element;
- wherein the final drive assembly comprises a gear set positioned adjacent to the final transfer element, the gear set being selectively engagable with the final transfer element in the engaged condition such that rotation of the gear set is transferred to the final transfer element and the gear set being selectively disengageable from the final transfer element in the disengaged condition such that rotation of the final transfer element is not transferred to the gear set;
- wherein the gear set comprises:
  - a first gear element for receiving rotational input from an input gear, the first gear element being engaged with an intermediate transfer element such that the intermediate transfer element turns with the final transfer element;
  - a second gear element for receiving rotational input from the intermediate transfer element; and
  - a carrier element rotated by the second gear element; and
- wherein the gear set further comprises a carrier ring at least partially supporting the second gear element, the carrier ring being positioned in an annular channel in the first gear element and being rotatable freely with respect to the first gear element.

\* \* \* \* \*